United States Patent [19]
Chomette

[11] 3,965,808
[45] June 29, 1976

[54] INTERNAL BUN TOASTER

[75] Inventor: Albert Etienne Chomette, Forest Hills, N.Y.

[73] Assignee: Francis J. Fajella, Great Neck, N.Y.; a part interest

[22] Filed: Aug. 7, 1975

[21] Appl. No.: 602,648

[52] U.S. Cl. .................................... 99/419; 99/483
[51] Int. Cl.² ................................................. A47J 37/08
[58] Field of Search ............ 99/419, 420, 358, 442, 99/339, 483; 219/221, 236

[56] References Cited
UNITED STATES PATENTS

| | | | |
|---|---|---|---|
| 1,902,564 | 3/1933 | Mabey | 99/419 |
| 2,617,349 | 11/1952 | Tucker | 99/419 |
| 2,648,275 | 8/1953 | Thompson | 99/419 |

*Primary Examiner*—Peter Feldman
*Assistant Examiner*—Arthur O. Henderson
*Attorney, Agent, or Firm*—Dayton R. Stemple, Jr.

[57] ABSTRACT

A bun or roll toaster wherein the bun is spiked over and around the polytetrafluoroethylene-coated, stainless steel spike with an interior copper sleeve enclosing an easily controlled heating element whereby on removal from the spike the bun is toasted internally, with an opening appropriately sized for the item to be sandwiched therein, such as a cylindrical sausage, frankfurter, hamburger or sausage patty.

12 Claims, 4 Drawing Figures

U.S. Patent  June 29, 1976  3,965,808
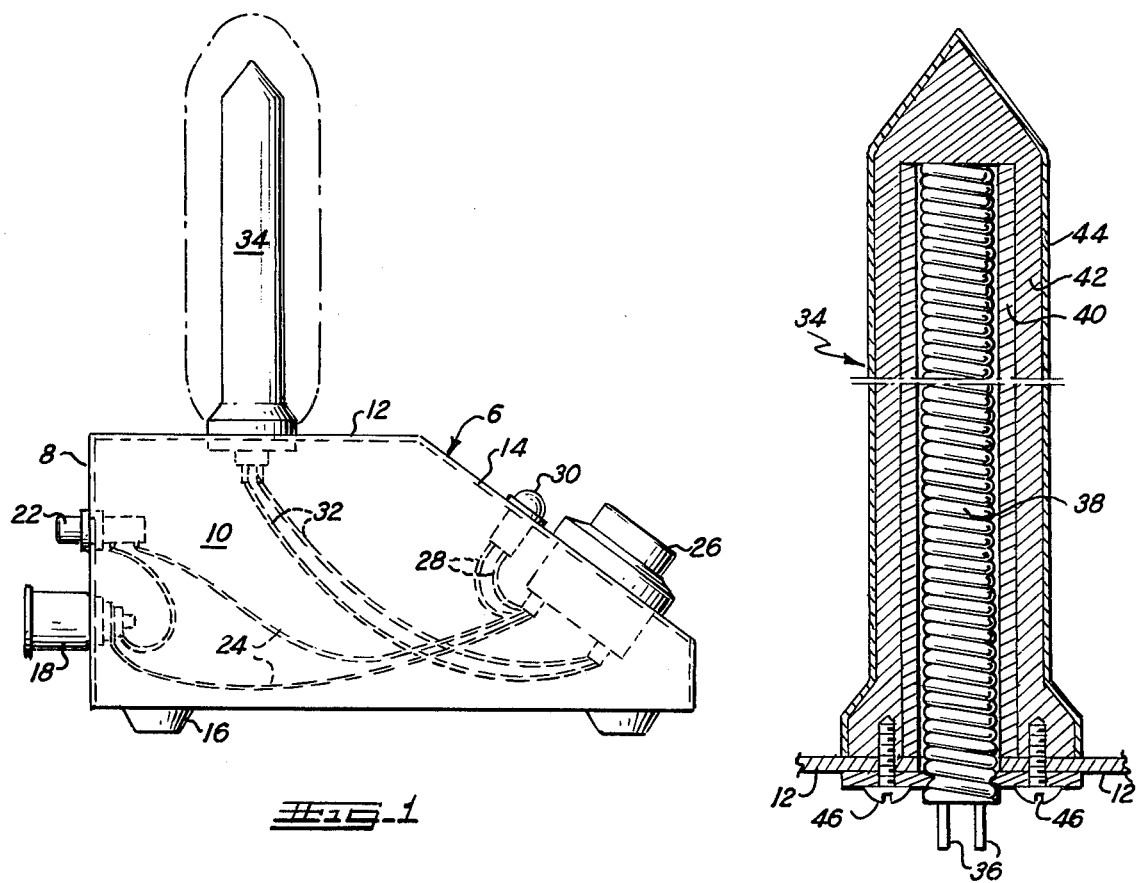
_FIG. 1_
_FIG. 3_
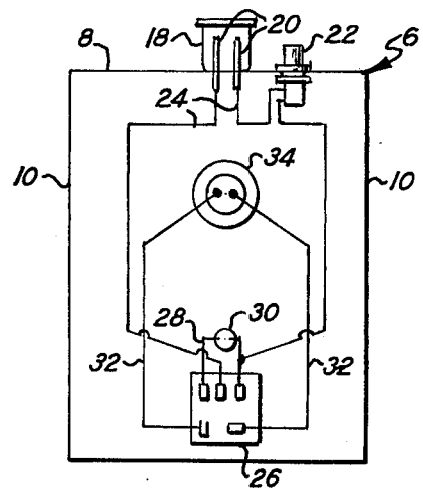
_FIG. 2_
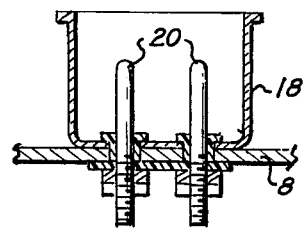
_FIG. 4_

INTERNAL BUN TOASTER

SUMMARY OF INVENTION

This invention relates to new and useful improvements in an internal bun toaster and more particularly, seeks to provide a sanitary spiked heating element that is readily cleaned and loaded, easily controlled for fast toasting without scorching or burning, grounded for safety, polytetrafluoroethylene-coated for easy spiking and cleaning, and copper sleeved for efficient heating.

Prior Art

As a general rule, buns or rolls such as those used for hamburgers and frankfurters are split through the biggest plane for toasting. However, some patents such as Mabey, U.S. Pat. No. 1,902,564; Thompson, U.S. Pat. No. 2,648,275 and Martin, U.S. Pat. No. 3,377,943; disclose spike-shaped heating elements for toasting an internal opening therein.

In spite of such art, there appears to be no spiked toasters available commercially. The aforementioned art shows openings or depressions that collect crumbs which are always present with bread products, which in turn create illegal unsanitary conditions that may not meet local health codes and thus preclude their use in commercial establishments. Moreover, the units do not appear to be designed for efficient, convenient and economical operation.

Objects of the Invention

It is an object of this invention to provide a spike heating element to toast an internal opening in a bun or roll that is readily and easily cleaned.

It is another object of this invention to provide such spiked heating elements of different sizes and shapes that are interchangeable on the basic cabinet unit.

It is a further object of this invention to provide such a toaster that presents only a smooth exterior surface with no depressions to collect crumbs or other dirt.

It is an added object of this invention to provide such a toaster with heat control means to increase the heater life.

It is also an object of this invention to provide a copper sleeve between the heating element and exterior stainless steel to retain heat in the spike heating element.

It is an additional object of this invention to provide a polytetrafluoroethylene coating for at least the tip end of the spike to facilitate placement and avoid sticking of the rolls.

With these and other objects, the nature of which will be apparent, the invention will be more fully understood by references to the drawings, the accompanying detailed description, and the appended claims.

BRIEF DESCRIPTION OF THE DRAWINGS

In the drawings:

FIG. 1 is a side view of a toaster constructed in accordance with the invention;

FIG. 2 is a horizontal diagrammatic section of the base of FIG. 1 showing the wiring detail;

FIG. 3 is a vertical section of the heating element taken along line 3—3 of FIG. 1; and, FIG. 4 is a detailed horizontal section taken on line 4—4 of FIG. 1.

DESCRIPTION OF THE PREFERRED EMBODIMENTS

Referring to the drawings in detail, the invention as illustrated is embodied in a single spike toaster which could obviously be modified to a multi-spike unit for a commercial establishment.

Cabinet 6 is formed of a stainless steel sheet without any seams or pockets exposed except underneath the cabinet and includes rear wall 8, side walls 10, 10, top panel 12, and front slanting control panel 14, all resting on non-sliding supports 16. The rear panel 8 supports a hooded connecting socket 18, that protects the prongs, 20, 20, from crumbs or other dirt. The entire cabinet is grounded through a three prong grounding plug and connecting cord (not shown) that fits into socket 18 and connects to a 110 or 230 volt current source.

Lead wires 24 connect prongs 20 to the infinite control switch 26 with a light spring fuse 22 in the circuit that turns on the light as a warning when the electrical circuit is broken. The switch in turn is connected by leads 32 to the spike toaster member 34. A pilot light 30 is also shown connected to the switch by leads 28 to indicate when the heating unit is on. This light may be optionally connected to the heating unit and set to be lit when the heater temperature is above a warning level, e.g. 150°, regardless of whether there is current passage. Lights 22 and 30 will probably be different colors for convenience or the lighting may read "hot", "check", etc. The toaster member includes lead prongs 36, 36, and resistance heating cartridge 38 embedded in an electrical insulation medium, such as compressed magnesium oxide. The cartridge is encased in a copper sleeve 40 which is surrounded by a smooth seamless stainless steel sleeve 42, which is coated by a layer 44 of polytetrafluoroethylene. The spike 34 is detachably secured to the top panel 12 by two screws 46, 46 from underneath the cabinet to make interchange simple and sanitary.

With a 230 volt, 920 watt cartridge heater, the spike produces heat as follows. (If turned immediately to 7, it will reach the various temperatures much quicker.)

| Switch Position | Tempera-ture F° | | Minutes | Electric Input in Seconds | |
| --- | --- | --- | --- | --- | --- |
| | From | To | | On | Off |
| 1 | 70 | 150 | 4 | 5 | 28 |
| 2 | 150 | 180 | 3 | 6 | 28 |
| 3 | 180 | 230 | 3 | 7 | 18 |
| 4 | 230 | 300 | 3 | 8 | 14 |
| 5 | 300 | 350 | 3 | 9 | 12 |
| 6 | 350 | 450 | 3 | 10 | 10 |
| 7 | 450 | 600 | 3 | Cont. | 0 |

Thus, the above heater provides a temperature range for treating the internal surface of a bun that is placed over the spike heater from merely warming at 150° to 300° toasting without burning at 300° to 350°, and quickly toasting at 350° to 450°(but must be watched and removed before burning). A conventional bread toaster cut-off device to stop the heat after reaching the desired browning stage may be used.

Although the copper sleeve and polytetrafluoroethylene (on the sharpened point or the entire working surface) are optional features, they have been found highly desirable for effective, easy and economical operation of the unit. The copper sleeve improves the conductance to the surface of the spike and the polytetrafluoroethylene facilitates the placing of a bun over the spike and avoids any possible sticking of the bun or loose crumbs thereto.

The spike will be shaped, of course, in accordance with the bread product to be placed thereon. Different shaped and sized spikes may be provided on different cabinets, may be interchangeable on the same cabinet, or may be mounted on a single cabinet having multi-spikes.

The spike 34 as shown is shaped for a frankfurter or cylindrical sausage bun, whereas a hamburger or sausage patty bun would require a relatively flatter, semi-circular spike element that would come to a sharp edge along the top so as to penetrate the bun when it is placed down over the spike. The shape of the internal heating element would be changed also. Generally, buns will not be cut prior to being placed on the spike, which will in effect be the cutting as well as the toasting element. Therefore, there will be a smaller opening along the periphery of the bun in constrast to that generally used where the bun is cut just short of being split into two pieces. However, such split rolls could be placed on the spikes disclosed herein.

I claim:
1. An internal bun toaster comprising a base cabinet open only downwardly, said cabinet having a smooth upper and side exterior with no depressions therein, a toasting spike extending upwardly from the highest plane of said base, and having a smooth surface with no depressions therein, said spike having a sharp edge or point at its uppermost extent that will readily penetrate the interior of a bun placed longitudinally down over said spike, said spike being shaped to extend throughout a substantial portion of the largest interior plane of said bun, electrical heating means imbedded in said spike and capable of heating the exterior surface of said spike sufficient to warm or toast buns in contact therewith, a switch mounted on said base below said spike to variably control the input of electric power to said heating means, a hooded electrical socket mounted on said base below said spike adapted to prevent collection of crumbs and dirt, and electrical connections between said socket, switch and spike located within the interior of said base.

2. The bun toaster of claim 1 wherein the exterior of said spike is capable of heating from 150° to 450°F.

3. The bun toaster of claim 2 wherein the exteriors of said base and said spike are formed of stainless steel.

4. The bun toaster of claim 3 wherein a copper sleeve is positioned between said stainless steel exterior and said electrical heating means.

5. The bun toaster of claim 3 wherein said spike is coated with polytetrafluoroethylene.

6. The bun toaster of claim 3 wherein said spike is cylindrical shaped with a sharp point at the top and sized to penetrate a cylindrical bun.

7. The bun toaster of claim 6 wherein the top end of said spike is coated with polytetrafluoroethylene.

8. The bun toaster of claim 7 wherein a copper sleeve is positioned between said stainless steel exterior and said electrical heating means.

9. The bun toaster of claim 1 with means for grounding at said electrical socket.

10. The bun toaster of claim 1 wherein a light fuse is located within the circuitry that lights when the heat source circuit is broken.

11. The bun toaster of claim 1 wherein a heat lamp is located within the spike circuit that lights when said surface temperature is above a set temperature.

12. The bun toaster of claim 11 wherein said set temperature is above 150° F.

* * * * *